(12) United States Patent
Tsuzuki

(10) Patent No.: US 8,270,328 B2
(45) Date of Patent: Sep. 18, 2012

(54) NETWORK DEVICE

(75) Inventor: Ryosuke Tsuzuki, Anjo (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 273 days.

(21) Appl. No.: 12/714,566

(22) Filed: Mar. 1, 2010

(65) Prior Publication Data
US 2010/0246424 A1  Sep. 30, 2010

(30) Foreign Application Priority Data

Mar. 25, 2009 (JP) ................................. 2009-073773

(51) Int. Cl.
G08C 17/00 (2006.01)
G06F 1/00 (2006.01)
H04B 1/38 (2006.01)
H04B 1/16 (2006.01)

(52) U.S. Cl. ...................... 370/311; 713/323; 455/343.1; 455/574

(58) Field of Classification Search .......................... None
See application file for complete search history.

(56) References Cited

U.S. PATENT DOCUMENTS
6,026,494 A * 2/2000 Foster ............................ 713/320
2002/0046355 A1  4/2002 Takeuchi FOREIGN PATENT DOCUMENTS
| EP | 1 168 717 A2 | 1/2002 |
|---|---|---|
| JP | 9-149095 A | 6/1997 |
| JP | 9-181840 A | 7/1997 |
| JP | 2002-118563 | 4/2002 |
| JP | 2008-123128 | 5/2008 |
| WO | 99/54806 | 10/1999 |
| WO | 02/28019 A2 | 4/2002 |
| WO | 2007/049203 A2 | 5/2007 |

OTHER PUBLICATIONS

JP Office Action dtd Dec. 14, 2010, JP Appln. 2009-073773, English Translation.
Extended EP Search Report dtd Jul. 30, 2010, EP Appln. 10250364.6-2416.
IEEE: "IEEE Draft P802.3az D1.1" [Online] Jan. 1, 2009, XP002589509, IEEE P802.3az Energy Efficient Ethernet Task Force, retrieved Jun. 29, 2010 <http//www.ieee802.org/3/az>, 18 pages.
EP Office Action dated Aug. 26, 2011; EP Application No. 10 250 364.6-2416.
Extended EP Search Report dtd Apr. 5, 2012, EP Appln. 12157338.0-2416.

* cited by examiner

*Primary Examiner* — Clemence Han
(74) *Attorney, Agent, or Firm* — Banner & Witcoff, Ltd.

(57) ABSTRACT

A network device may be provided with a PHY layer process unit, a determination unit configured to determine that a link state is a link up state or a link down state, and a first control unit configured to control an electrical power supply for the PHY layer process unit. The first control unit may be configured to stop a continuous electrical power supply for the PHY layer process unit if the determination unit determines that the link state is the link down state during a first period in which the continuous electrical power supply is being performed, perform a temporary electrical power supply for the PHY layer process unit during a second period, and commence the continuous electrical power supply if the temporary electrical power supply is performed during the second period and the determination unit determines that the link state is the link up state.

9 Claims, 10 Drawing Sheets

| State of MFD | Main CPU 36 | Sub CPU 38 | LCD 18 | PHY and MAC 40,42 |
|---|---|---|---|---|
| Processing State 70 | Clock Supplied | Clock Supplied | ON | ON |
| Stand-by State 72 | Clock Supplied | Clock Supplied | ON | ON |
| L-Sleep State 74 | Clock Supplied | Clock Supplied | OFF | ON |
| D-Sleep State 76 | Clock Suspended | Clock Supplied | OFF | Link Up State: ON Link Down State: OFF (May be Temporarily ON) |

NETWORK DEVICE

CROSS-REFERENCE TO RELATED APPLICATION

This application claims priority to Japanese Patent Application No. 2009-073773, filed on Mar. 25, 2009, the contents of which are hereby incorporated by reference into the present application.

TECHNICAL FIELD

This specification discloses a network device configured to be connected with a network, and in particular discloses technology for reducing the power consumption of the network device.

DESCRIPTION OF RELATED ART

An image formation device to be connected with an external device such as a PC in a communicable manner is known. The image formation device comprises a PHY layer (Physical Layer) process unit for executing a process of a PHY layer of an OSI (Open Systems Interconnection) reference model, and a MAC layer process unit for executing a process of a MAC layer (Media Access Control Layer). The image formation device shifts to a power saving state if processing is not executed continuously for a predetermined time under a normal state. In the power saving state, the amount of power that is supplied to the PHY layer process unit and the MAC layer process unit will be less in comparison to the normal state.

SUMMARY

With the foregoing technology, while the power source of the network device (image formation device in the foregoing example) is turned ON, power is constantly supplied to the PHY layer process unit and the MAC layer process unit. This specification discloses technology for realizing further power saving of the network device.

One technology disclosed in this specification is a network device configured to be connected with a network. The foregoing "network" may be rephrased, but not limited to, as a "LAN" or a "network that is compatible with Ethernet (registered trademark) standard." The network device may comprise a PHY layer process unit configured to execute a process of a PHY layer, a determination unit configured to determine that a link state is a link up state or a link down state by utilizing information given from the PHY layer process unit, and a first control unit configured to control an electrical power supply for the PHY layer process unit. The link up state may be a state in which the network device is being connected with the network in a communicable manner, and the link down state may be a state in which the network device is not being connected with the network in a communicable manner. As an example of the link down state, considered may be a state where a communication cable is not connected with the network device, or a state in which the communication cable is connected with an other device (for example, HUB) to be connected with the network device, but the other device is not functioning (for instance, a state where a power source of the other device is turned OFF).

The first control unit may be configured to stop a continuous electrical power supply for the PHY layer process unit, if the determination unit determines that the link state is the link down state during a first period. The first period may be a period in which the continuous electrical power supply for the PHY layer process unit is being performed. The first control unit may be configured to perform a temporary electrical power supply for the PHY layer process unit during a second period. The second period may be a period after the continuous electrical power supply for the PHY layer process unit is stopped. The first control unit may be configured to commence the continuous electrical power supply for the PHY layer process unit, if the temporary electrical power supply for the PHY layer process unit is performed during the second period and the determination unit determines that the link state is the link up state. The determination unit may execute the foregoing determination based on information from the PHY layer process unit while the temporary electrical power supply is being executed to the PHY layer process unit, or execute the foregoing determination based on information from the PHY layer process unit after the completion of the temporary electrical power supply.

The first control unit will suffice so as long as it is able to control the power supply to the PHY layer process unit as described above, and is not required to constantly control the power supply as described above. For instance, the network device may be configured to be set to either mode; specifically, a first mode or a second mode. If the first control unit is to be set to the first mode, the first control unit may control the power supply to the PHY layer process unit as described above. If the first control unit is to be set to the second mode, even if the determination unit determines that the link state is the link down state, the first control unit may not stop the power supply to the PHY layer process unit.

This specification additionally discloses another network device. This network device may comprise the PHY layer process unit, the MAC layer process unit, the determination unit, and a control unit. The control unit may be configured to control an electrical power supply for the MAC layer process unit. The control unit may be configured to stop a continuous electrical power supply for the MAC layer process unit in a case where the determination unit determines that the link state is the link down state, and commence the continuous electrical power supply for the MAC layer process unit in a case where the determination unit determines that the link state is the link up state.

The control method and computer program for realizing the foregoing network device are also novel and effective. A computer readable medium including the computer program is also novel and effective.

DETAILED DESCRIPTION OF THE PREFERRED EMBODIMENT

First Embodiment (Configuration of System)

Figure 1:
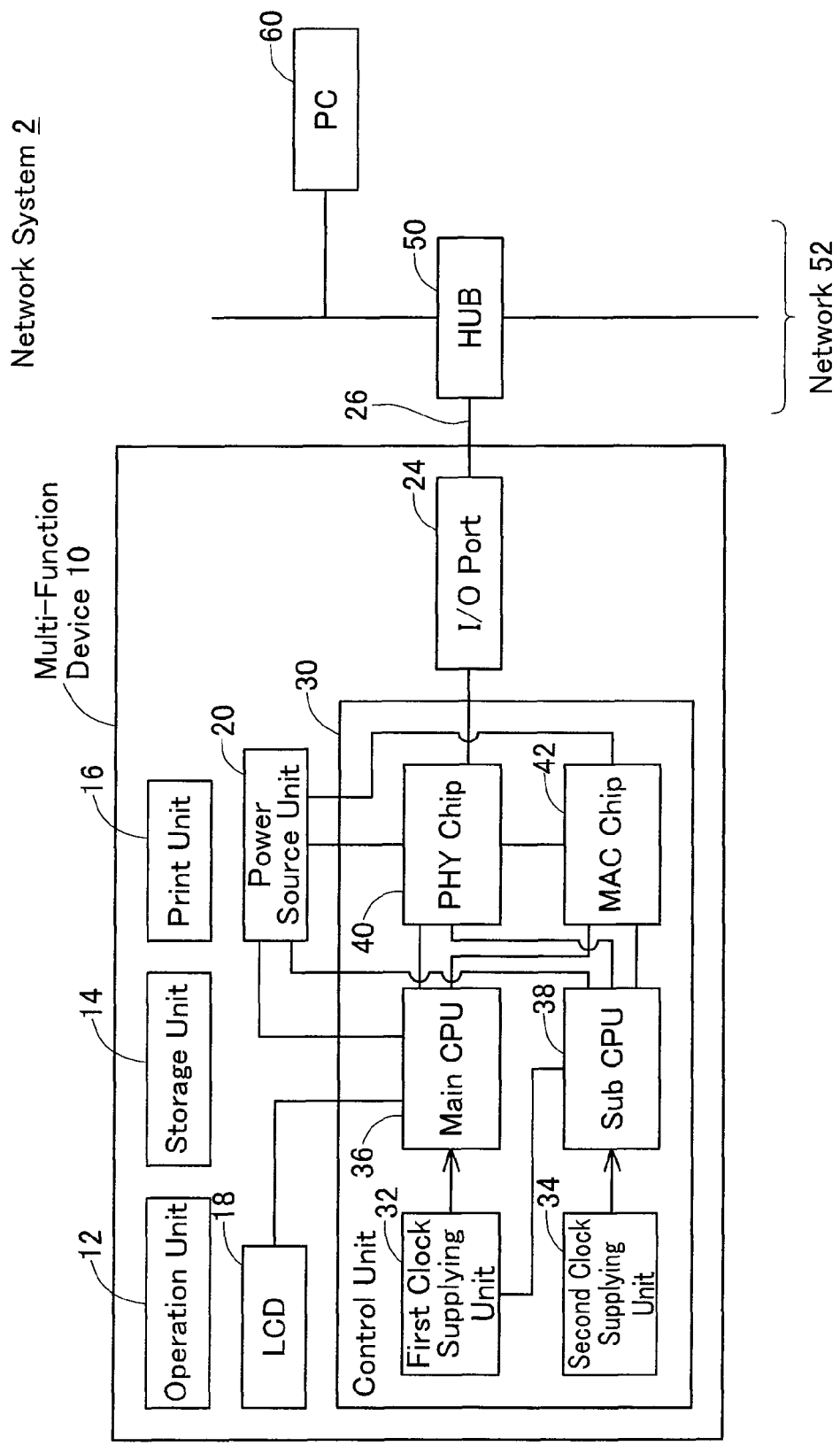
FIG. 1 shows an example of a configuration of a network system.

An embodiment is now explained with reference to the attached drawings. FIG. 1 shows a schematic diagram of a network system 2 of this embodiment. The network system 2 is a communication system that is compliant with the Ethernet (registered trademark) standard. The Ethernet (registered trademark) may also be a Fast Ethernet, or a Gigabit Ethernet. The network system 2 comprises a multi-function device 10, a network 52, a PC 60 and so on. The multi-function device 10 and the PC 60 are connected to be mutually communicable via the network 52. The network 52 comprises a HUB 50.

(Configuration of Multi-Function Device 10)

The multi-function device 10 comprises an operation unit 12, a storage unit 14, a print unit 16, an LCD (Liquid Crystal Display) 18, a power source unit 20, an I/O port 24, a control unit 30 and so on. The operation unit 12 comprises a plurality of keys. The storage unit 14 stores, for example, image data to be displayed on the LCD 18. The storage unit 14 additionally stores programs to be executed by the control unit 30. The print unit 16 prints print data that is sent from the PC 60. The LCD 18 displays various types of information. The power source unit 20 is connected with a power source not shown. Power is supplied from the power source unit 20 to each unit 14, 16, 18, 30 and so on. One end of a LAN cable 26 is connected with the I/O port 24. The other end of the LAN cable 26 is connected with the HUB 50.

The control unit 30 comprises a first clock supplying unit 32, a second clock supplying unit 34, a main CPU 36, a sub CPU 38, a PHY chip 40, and a MAC chip 42. The first clock supplying unit 32 supplies a clock to the main CPU 36. The second clock supplying unit 34 supplies a clock to the sub CPU 38. The operating frequency of the main CPU 36 is greater than the operating frequency of the sub CPU 38.

The main CPU 36 executes various types of processing according to the program stored in the storage unit 14. The types of processing to be executed by the main CPU 36 are listed below.

(1) The main CPU 36 executes a processing for switching a light source of the LCD 18 between a lit state and an unlit state. The main CPU 36 additionally executes display processing for supplying the image data stored in the storage unit 14 to the LCD 18, and displaying the image data on the LCD 18.

(2) The main CPU 36 executes a processing of data to be communicated with the PC 60. For example, the main CPU 36 executes a print processing for driving the print unit 16 based on a print command packet that is sent from the PC 60.

(3) The main CPU 36 is connected with the power source unit 20. The main CPU 36 executes a processing for switching the PHY chip 40 and the MAC chip 42 between an ON state and an OFF state by sending a command to the power source unit 20. The ON state is a state where the power supply is being performed, and the OFF state is a state where the power supply is being stopped. In the ensuing explanation, a command for setting the PHY chip 40 and the MAC chip 42 to the ON state is referred to as a "supply command" and a command for setting the PHY chip 40 and the MAC chip 42 to the OFF state is referred to as a "stop command."

(4) The main CPU 36 is connected with the PHY chip 40 and the MAC chip 42. The main CPU 36 acquires information from the PHY chip 40 and the MAC chip 42. Moreover, the main CPU 36 sends a predetermined command to the PHY chip 40 and the MAC chip 42.

The sub CPU 38 executes various types of processing according to the program stored in the storage unit 14. The types of processing to be executed by the sub CPU 38 are listed below.

(1) The sub CPU 38 executes a processing for switching the first clock supplying unit 32 between a clock supply execution state and a clock supply suspended state. Specifically, in this embodiment, there is a state where the clock supply to the main CPU 36 is suspended (sleeping state of the main CPU 36). In this embodiment, in a state where the power of the multi-function device 10 is ON, the clock supply to the sub CPU 38 is constantly executed.

(2) The sub CPU 38 executes, in a case where a particular packet is received from the PC 60 while the main CPU 36 is in the sleeping state, a processing (for instance, reply processing) of the particular packet.

(3) The sub CPU 38 is connected with the power source unit 20. The sub CPU 38 executes a processing for switching the PHY chip 40 and the MAC chip 42 between the ON state and the OFF state while the main CPU 36 is in the sleeping state. Specifically, the sub CPU 38 sends the supply command and the stop command to the power source unit 20.

(4) The sub CPU 38 is connected with the PHY chip 40 and the MAC chip 42. The sub CPU 38 acquires information from the PHY chip 40 and the MAC chip 42. Moreover, the sub CPU 38 sends a predetermined command to the PHY chip 40 and the MAC chip 42. Furthermore, the sub CPU 38 detects a link state based on specific information described later that is obtained from the PHY chip 40. The link state is information indicating whether the multi-function device 10 is connected with the network 52 in a communicable manner. In the ensuing explanation, the state where the multi-function device 10 is connected with the network 52 in a communicable manner is referred to as the "link up state", and the state where the multi-function device 10 is not connected with the network 52 in a communicable manner is referred to as the "link down state." As examples of the link down state, considered may be a state where the LAN cable 26 is not connected with the I/O port 24, and a state where the LAN cable 26 is connected with the I/O port 24 but the HUB 50 is not operating.

The PHY chip 40 executes a processing of the physical layer of the OSI reference model. The PHY chip 40 is connected to the I/O port 24. The PHY chip 40 is connected to the MAC chip 42. The PHY chip 40 is also connected with the power source unit 20. The PHY chip 40 is unable to execute the processing in the OFF state. When the PHY chip 40 is in the ON state, the PHY chip 40 shapes a waveform of a signal input to the I/O port 24, and sends the shaped pulse signal to the MAC chip 42. Moreover, when the PHY chip 40 is in the ON state, the PHY chip 40 sends specific information to the sub CPU 38. The foregoing specific information includes first information concerning whether the LAN cable 26 is connected with the I/O port 24, and second information concerning whether the pulse signal sent from the HUB 50 is received.

The MAC chip 42 executes a processing of the MAC layer which is a sub layer of the data link layer of the OSI reference model. The MAC chip 42 is connected with the power source unit 20. The MAC chip 42 is unable to execute the processing in the OFF state. When the MAC chip 42 is in the ON state, the MAC chip 42 retrieves a MAC frame (for instance, source MAC address, destination MAC address, data length, contents of data, etc.) from the foregoing shaped pulse signal, and sends the MAC frame to the main CPU 36 and the sub CPU 38.

(Status of Multi-Function Device 10)

Figures 2, 3:
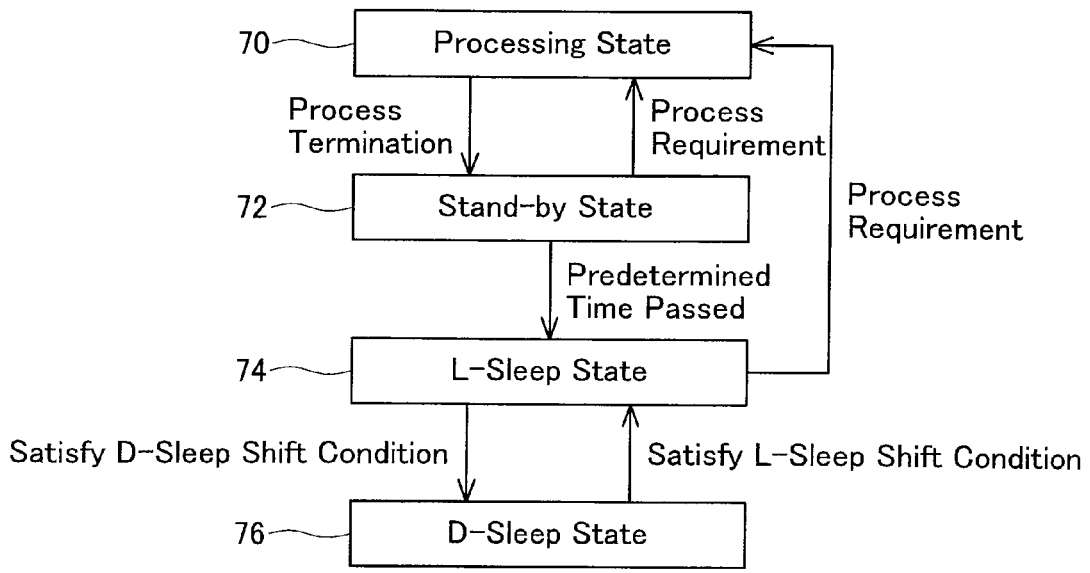
FIG. 2 is a diagram for explaining a situation where a state of a multi-function device is changed.
FIG. 3 shows a relationship between a state of the multi-function device and a state of each unit.

The states of the multi-function device 10 are now explained. FIG. 2 shows the situation of the state of the multi-function device 10 being changed. FIG. 3 shows the relationship between the state of the multi-function device 10 and the state of the each unit 18, 36, 38, 40, 42. As shown in FIG. 2, the multi-function device 10 changes among the following states; namely, processing state 70, stand-by state 72, L-sleep (Light sleep) state 74, and D-sleep (Deep sleep) state 76. The processing state 70 is a state where the main CPU 36 is executing a specific processing. Here, as examples of the specific processing, considered may be the foregoing print processing, display processing, and the like. As shown in FIG. 3, in the processing state 70, the clock is supplied to the main CPU 36 and the sub CPU 38. In the processing state 70, the light source of the LCD 18 is in the lit state, and the image data is supplied to the LCD 18. In addition, in the processing state 70, the PHY chip 40 and the MAC chip 42 are in the ON state.

As shown in FIG. 2, when the main CPU 36 completes the foregoing specific processing (print processing, display processing or the like), the state proceeds to the stand-by state 72. As shown in FIG. 3, in the stand-by state 72, the clock is supplied to the main CPU 36 and the sub CPU 38. In addition, in the stand-by state 72, the light source of the LCD 18 is in the lit state, and the PHY chip 40 and the MAC chip 42 are in the ON state.

As shown in FIG. 2, if a command is input for executing the foregoing specific processing in the stand-by state 72 (for instance, reception of the print packet or operation of the operation unit 12 (refer to FIG. 1) by the user), the state proceeds to the processing state 70. Moreover, if a state where a command for executing the foregoing specific processing is not input by the user in the stand-by state 72 continues for a predetermined time, the state proceeds to the L-sleep state 74. As shown in FIG. 3, in the L-sleep state 74, the clock is supplied to the main CPU 36 and the sub CPU 38. In the L-sleep state 74, the light source of the LCD 18 is in the unlit state, and the PHY chip 40 and the MAC chip 42 are in the ON state.

As shown in FIG. 2, if the command is input for executing the foregoing specific processing in the L-sleep state 74, the state proceeds to the processing state 70. If a specific condition is satisfied in the L-sleep state 74, the state proceeds to the D-sleep state 76. In this embodiment, the foregoing specific condition is that data is not being communicated, and there is no packet for which the main CPU 36 should execute processing. As shown in FIG. 3, in the D-sleep state 76, the clock supply to the main CPU 36 is suspended. That is, the main CPU 36 is in the sleeping state. In the D-sleep state 76, the light source of the LCD 18 is in the unlit state. In the D-sleep state 76, the PHY chip 40 and the MAC chip 42 are in the ON state if the link state is the link up state. Meanwhile, in the D-sleep state 76, the PHY chip 40 and the MAC chip 42 are in the OFF state if the link state is the link down state. Although this will be explained later in detail, even in the OFF state, if a certain condition (condition of S20 of FIG. 5) is satisfied, the PHY chip 40 and the MAC chip 42 temporarily become the ON state.

As shown in FIG. 2, if the command is input for executing the foregoing specific processing in the D-sleep state 76, the state proceeds to the L-sleep state 74 (in other words, after the clock supply to the main CPU 36 is resumed), then proceeds to the processing state 70.

(Processing to be Executed by Sub CPU 38)

Contents of the processing to be executed by the sub CPU 38 are now explained in detail. In this embodiment, the main CPU 36 basically executes the processing in a state where the clock is being supplied to the main CPU 36 (in other words, in the processing state 70, the stand-by state 72, and the L-sleep state 74). However, the sub CPU 38 executes the processing shown in FIG. 4 and FIG. 5.

Figure 4:
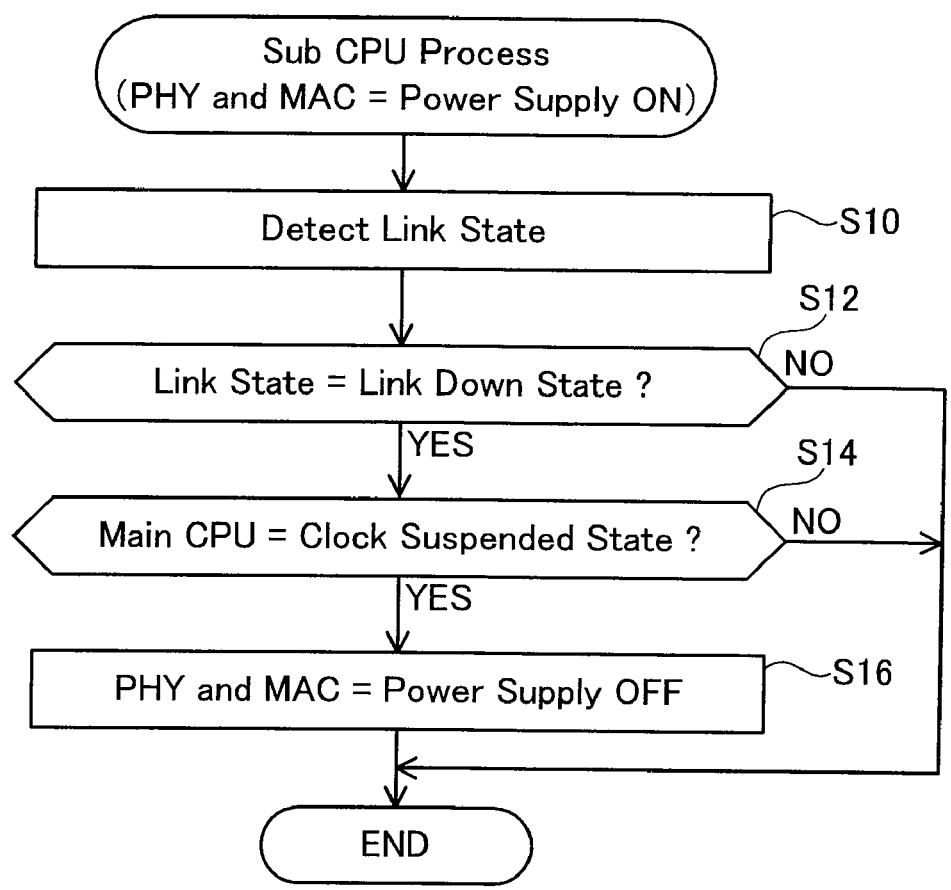
FIG. 4 shows a flowchart of processing to be executed by a sub CPU.

The sub CPU 38 periodically executes the processing shown in FIG. 4 while the PHY chip 40 and the MAC chip 42 are in the ON state regardless of which state 70 to 76 the multi-function device 10 is in. The sub CPU 38 detects (identifies) the link state based on the foregoing specific information (the first information and the second information) obtained from the PHY chip 40 (S10). For example, if the foregoing specific information including the first information indicating that the LAN cable 26 is not connected with the I/O port 24 is obtained, the sub CPU 38 determines that the link state is the link down state, and determines YES at S12. Moreover, if the foregoing specification including the second information indicating that the pulse signal sent from the HUB 50 is not being received is obtained, the sub CPU 38 determines that the link state is the link down state, and determines YES at S12. If the determination is YES at S12, the sub CPU 38 executes S14 and S16.

Meanwhile, if the foregoing specific information including the first information indicating that the LAN cable 26 is connected with the I/O port 24 and the second information indicating that the pulse signal sent from the HUB 50 is received is obtained, the sub CPU 38 determines that the link state is the link up state, and determines NO at S12. Here, the sub CPU 38 skips S14 and S16 and ends the processing.

At S14, the sub CPU 38 determines whether the clock supply to the main CPU 36 is being executed. Specifically, the sub CPU 38 determines whether the state of the multi-function device 10 is in the D-sleep state 76. If the clock supply to the main CPU 36 is being executed, the sub CPU 38 determines NO at S14, skips S16, and ends the processing. Meanwhile, if the clock supply to the main CPU 36 is being suspended (if the state of the multi-function device 10 is in the D-sleep state 76), the sub CPU 38 determines YES at S14, and proceeds to S16. At S16, the sub CPU 38 sends the stop command to the power source unit 20. Consequently, the power source unit 20 stops the power supply to the PHY chip 40 and the MAC chip 42. The PHY chip 40 and the MAC chip 42 shift from the ON state to the OFF state.

Figure 5:
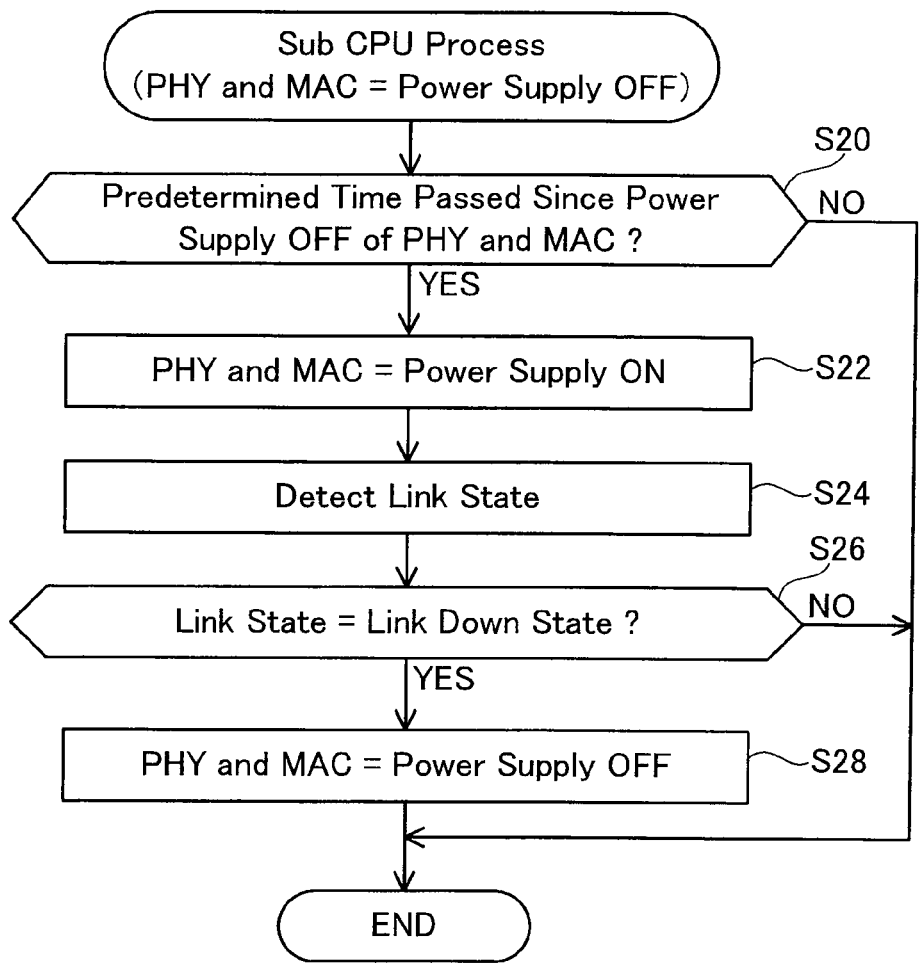
FIG. 5 shows a flowchart of processing to be executed by the sub CPU.

Moreover, the sub CPU 38 periodically executes the processing shown in FIG. 5 while the PHY chip 40 and the MAC chip 42 are in the OFF state. The sub CPU 38 monitors the lapse of a predetermined time from the latest timing (date and time) that the PHY chip 40 and the MAC chip 42 became the OFF state (S20). The foregoing latest timing refers to a timing at which S16 of FIG. 4 was executed and a timing at which S28 described later was executed, whichever is the later timing.

If the determination is YES at S20, the sub CPU 38 sends the supply command to the power source unit 20 (S22). Consequently, the power source unit 20 resumes the power supply to the PHY chip 40 and the MAC chip 42. The PHY chip 40 and the MAC chip 42 shift from the OFF state to the ON state.

The PHY chip 40 that has shifted to the ON state sends the foregoing specific information (the first information and the second information) to the sub CPU 38. The sub CPU 38 detects the link state based on the foregoing specific information obtained from the PHY chip 40 (S24). Moreover, the sub CPU 38 determines whether the link state is the link down state (S26). The processing of S24 and S26 is the same as the processing of S10 and S12 of FIG. 4. If the determination is YES at S26, the sub CPU 38 sends the stop command to the power source unit 20 (S28). Consequently, the PHY chip 40 and the MAC chip 42 shift once again from the ON state to the OFF state.

Although not shown in the flowchart, the sub CPU 38 monitors whether the foregoing specific condition (data is not being communicated, and there is no packet for which the main CPU 36 should execute processing) is satisfied in the L-sleep state 74. If the determination is YES in the foregoing case, the sub CPU 38 sends the command for the clock suspended to the first clock supplying unit 32. Consequently, the first clock supplying unit 32 suspends the clock supply to the main CPU 36. The state is thereby shifted from the L-sleep state 74 to the D-sleep state 76.

Furthermore, the sub CPU 38 monitors whether the command for executing the foregoing specific processing (print processing, display processing, etc.) is input in the D-sleep state 76. If the determination is YES in the foregoing case, the sub CPU 38 sends the command for resuming the clock supply to the first clock supplying unit 32. Consequently, the first clock supplying unit 32 resumes the clock supply to the main CPU 36. The multi-function device 10 thereby shifts from the D-sleep state 76 to the L-sleep state 74.

(Processing to be Executed by Main CPU 36)

Figure 6:
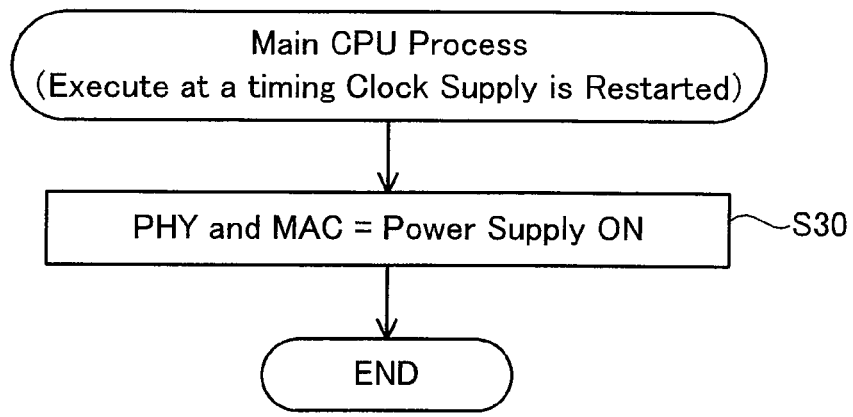
FIG. 6 shows a flowchart of processing to be executed by a main CPU.

The contents of the processing to be executed by the main CPU 36 are now explained in detail. Explanation of the print processing, display processing and the like to be executed by the main CPU 36 is omitted. As described above, in the D-sleep state 76, if the user input the command for executing the foregoing specific processing (print processing, display processing, and so on), the sub CPU 38 resumes the clock supply to the main CPU 36. Consequently, the D-sleep state 74 shifts to the L-sleep state 76. As shown in FIG. 6, the main CPU 36 to which the clock supply was resumed sends the supply command to the power source unit 20 (S30). At the point in time that S30 is executed, the PHY chip 40 and the MAC chip 42 may be in the ON state, or may be in the OFF state. If the PHY chip 40 and the MAC chip 42 are in the OFF state, the power source unit 20 resumes the power supply to the PHY chip 40 and the MAC chip 42. Meanwhile, if the PHY chip 40 and the MAC chip 42 are in the ON state, the power source unit 20 does not execute the processing and maintains the ON state.

Incidentally, the main CPU 36 to which the clock supply was resumed executes the foregoing specific processing according to the command. The main CPU 36 further sets the light source of the LCD 18 to the lit state, and resumes supplying the image data to the LCD 18. The state shifts from the L-sleep state 74 to the processing state 70.

Figure 7:
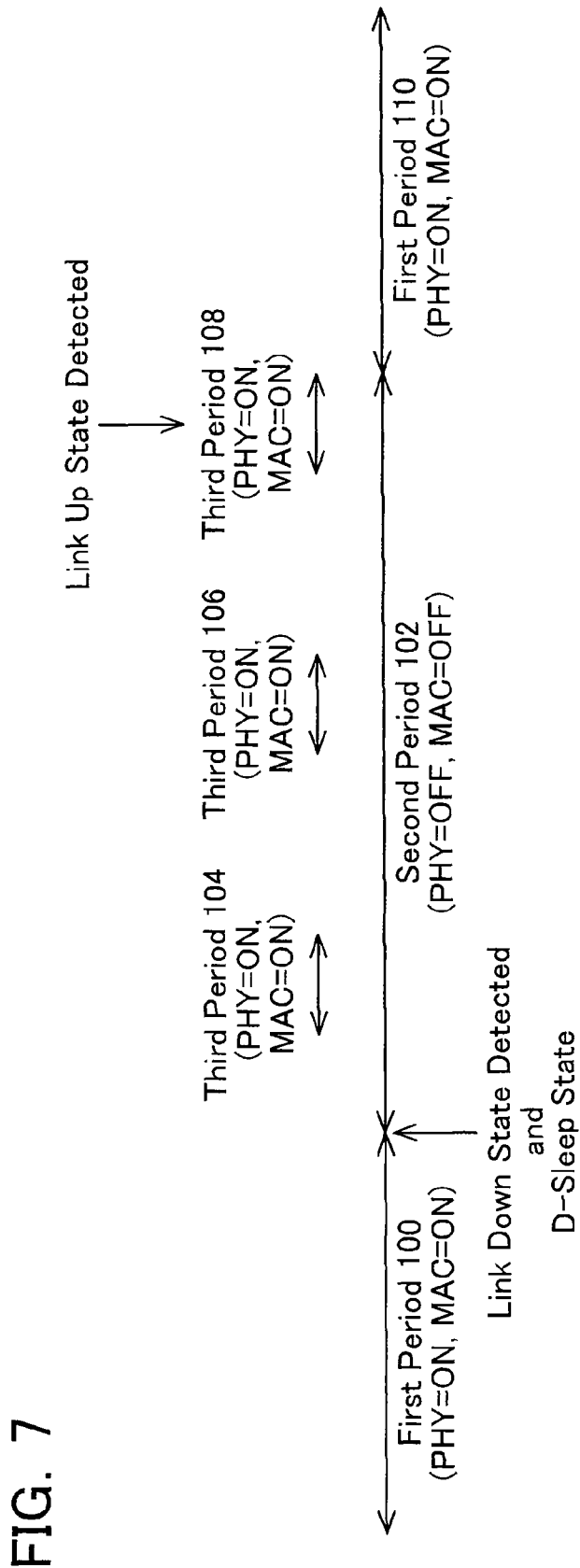
FIG. 7 shows an example of a state of a PHY chip and a MAC chip changing.

FIG. 7 shows an example of the state of the PHY chip 40 and the MAC chip 42 changing. During the link up state, a first period 100 in which the continuous electrical power supply for the PHY chip 40 and the MAC chip 42 is performed is realized. During the first period 100, if the link state becomes the link down state and the multi-function device 10 becomes the D-sleep state, the continuous electrical power supply for the PHY chip 40 and the MAC chip 42 is stopped (refer to S16 of FIG. 4), and shifts to a second period 102. The second period 102 includes three third periods 104, 106, 108 in which the temporary electrical power supply is executed to the PHY chip 40 and the MAC chip 42. In the case of the example shown in FIG. 7, since the link up state was not detected in the first third period 104 and the second third period 106, the second period 102 is maintained. Moreover, since the link up state was detected in the third period 108, the ON state of the third period 108 is maintained (S28 is skipped if it is NO at S26 of FIG. 5). Specifically, the continuous electrical power supply for the PHY chip 40 and the MAC chip 42 is commenced, and the period shifts to the first period 110 once again.

Figure 8:
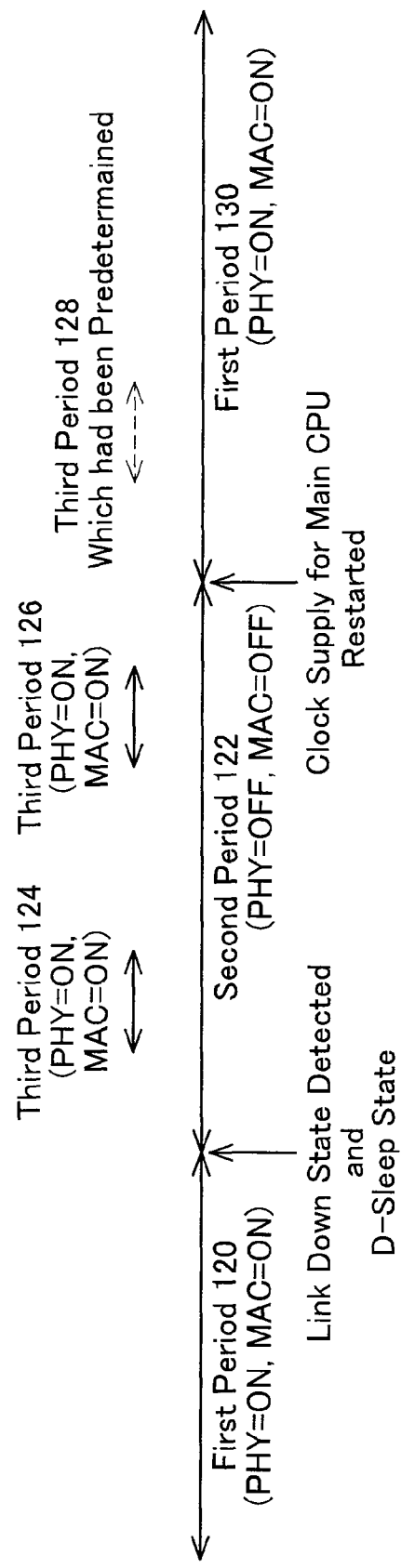
FIG. 8 shows an example of a state of the PHY chip and the MAC chip changing.

FIG. 8 shows another example of the state of the PHY chip 40 and the MAC chip 42 changing. In the example of FIG. 8 also, as with the case of FIG. 7, the first period 120 shifts to the second period 122. The second period 122 includes two third periods 124, 126. Even if the link up state is not detected in the first and second third periods 124, 126, if the clock supply to the main CPU 36 is resumed, the continuous electrical power supply for the PHY chip 40 and the MAC chip 42 is executed (S30 of FIG. 6), and the period shifts to the first period 130 once again. In the case of this example, if the clock supply was not resumed to the main CPU 36, the second period 122 is maintained without shifting to the first period 130, and the third period 128 is executed.

The network system 2 of this embodiment was explained in detail above. With the multi-function device 10 of this embodiment, during the first periods 100, 120, if the link state becomes the link down state and the multi-function device 10 becomes the D-sleep state 76, power saving of the second periods 102, 122 is realized by stopping the continuous electrical power supply for the PHY chip 40 and the MAC chip 42. Moreover, with the multi-function device 10 of this embodiment, the third periods 104, 106 108, 124, 126 in which the temporary electrical power supply is performed to the PHY chip 40 and the MAC chip 42 are provided during the second period 102. Thus, the link state can be confirmed even during the second period 102, 122. If the link up state is consequently detected, the multi-function device 10 can be returned to a communicable state by commencing the continuous electrical power supply for the PHY chip 40 and the MAC chip 42.

In this embodiment, when the main CPU 36 is in the non-sleeping state; that is, the processing state 70, the stand-by state 72, and the L-sleep state 74, the power supply to the PHY chip 40 and the MAC chip 42 is not stopped even if the link state is the link down state. In the processing state 70 and the stand-by state 72, since it is in the midst of processing or immediately after the execution of processing, it is likely that the user exists near the multi-function device 10. Moreover, even with the L-sleep state 74, since it is a state to be shifted from the stand-by state 72, it is likely that the user exists near the multi-function device 10. Meanwhile, in the D-sleep state 76, in comparison to the other states 70, 72, 74, it is unlikely that the user exists near the multi-function device 10. In the states 70, 72, 74 in which it is likely that the user exists near the multi-function device 10, it is likely that the user will execute the operation (for instance, the operation of connecting the LAN cable 26 to the I/O port 24) in order to shift from the link down state to the link up state. Based on this perspective, in this embodiment, the power supply to the PHY chip 40 and the MAC chip 42 is not stopped in the states 70, 72, 74. In the states 70, 72, 74, since the PHY chip 40 is maintained in a state of being able to send the foregoing specific information to the sub CPU 38, the multi-function device 10 can be shifted to a communicable state immediately after the user executes the foregoing operation. Meanwhile, in the D-sleep state 76 in which it is unlikely that the user exists near the multi-function device 10, since it is unlikely that the user will perform the foregoing operation, the power supply to the PHY chip 40 and the MAC chip 42 is stopped. Power saving of the multi-function device 10 is thereby realized.

Second Embodiment

The points that are different from the first embodiment are explained. In the first embodiment, as shown in FIG. 7 and FIG. 8, the temporary electrical power supply is executed to both the PHY chip 40 and the MAC chip 42 during the third periods 104, 106, 108, 124, 126. In order to confirm the link state, it will suffice so as long as the PHY chip 40 is in the ON state, and the MAC chip 42 does not need to be in the ON state. Based on this perspective, in this embodiment, power supply to the MAC chip 42 is not performed during the third period.

The processing shown in FIG. 4 and FIG. 6 is the same as the first embodiment. The contents of the processing shown in FIG. 5 are different from the first embodiment. The sub CPU 38 of this embodiment periodically executes the processing shown in FIG. 9 while the PHY chip 40 and the MAC chip 42 are in the OFF state. The sub CPU 38 monitors the lapse of a predetermined time from the latest timing (date and time) that the PHY chip 40 became the OFF state (S40). The foregoing latest timing refers to a timing that S16 of FIG. 4 was executed and a timing that S48 described later was executed, whichever is the later timing.

If the determination is YES at S40, the sub CPU 38 sends the supply command to the power source unit 20 for performing the power supply to the PHY chip 40 (S42). Consequently, the power source unit 20 resumes the power supply only to the PHY chip 40. The OFF state of the MAC chip 42 is maintained.

The sub CPU 38 detects the link state based on the foregoing specific information obtained from the PHY chip 40 that has shifted to the ON state (S44). The sub CPU 38 determines whether the link state is the link down state (S46). If the determination is YES at S46, the sub CPU 38 sends the stop command to the power source unit 20 for stopping the power supply to the PHY chip 40 (S48). Consequently, the PHY chip 40 shifts once again from the ON state to the OFF state. Moreover, if the determination is NO at S46, the sub CPU 38 sends the supply command to the power source unit 20 for performing the power supply to the MAC chip 42 (S50). Consequently, the MAC chip 42 shifts once again from the OFF state to the ON state.

Figure 9:
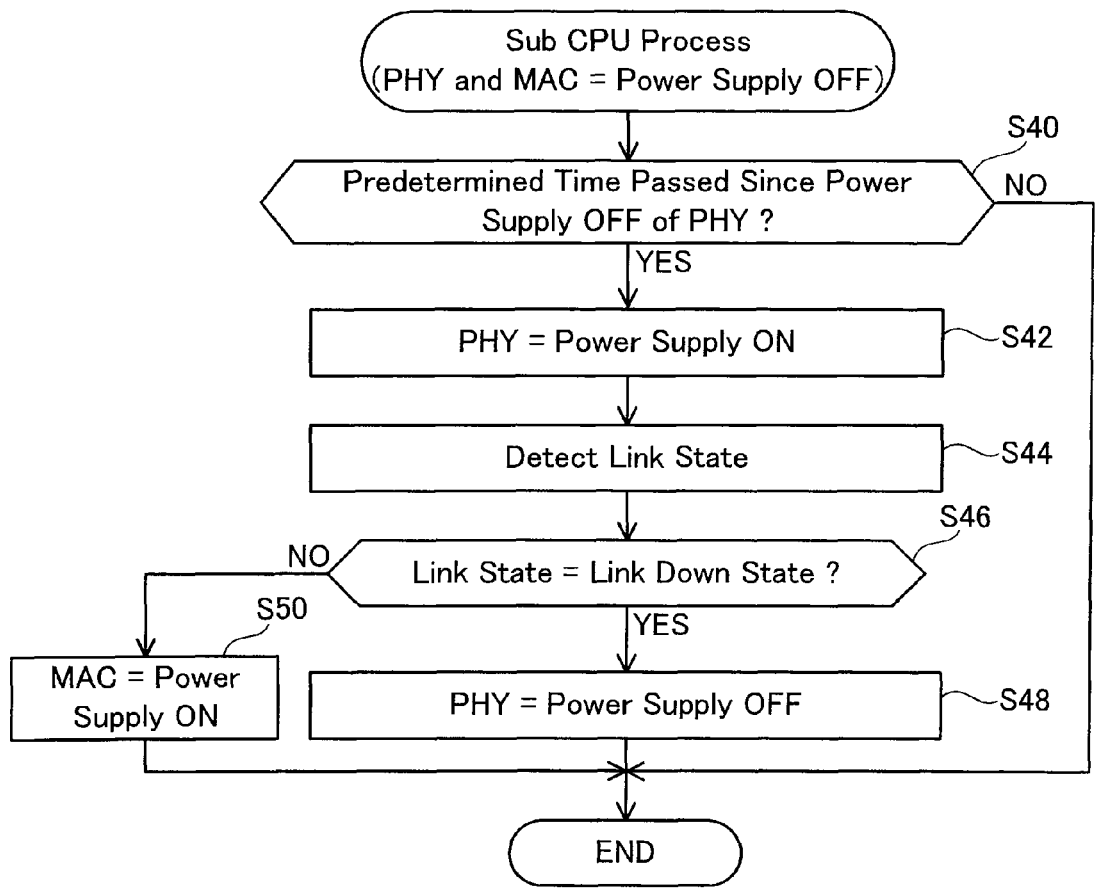
FIG. 9 shows a flowchart of processing to be executed by the sub CPU (second embodiment).
Figure 10:
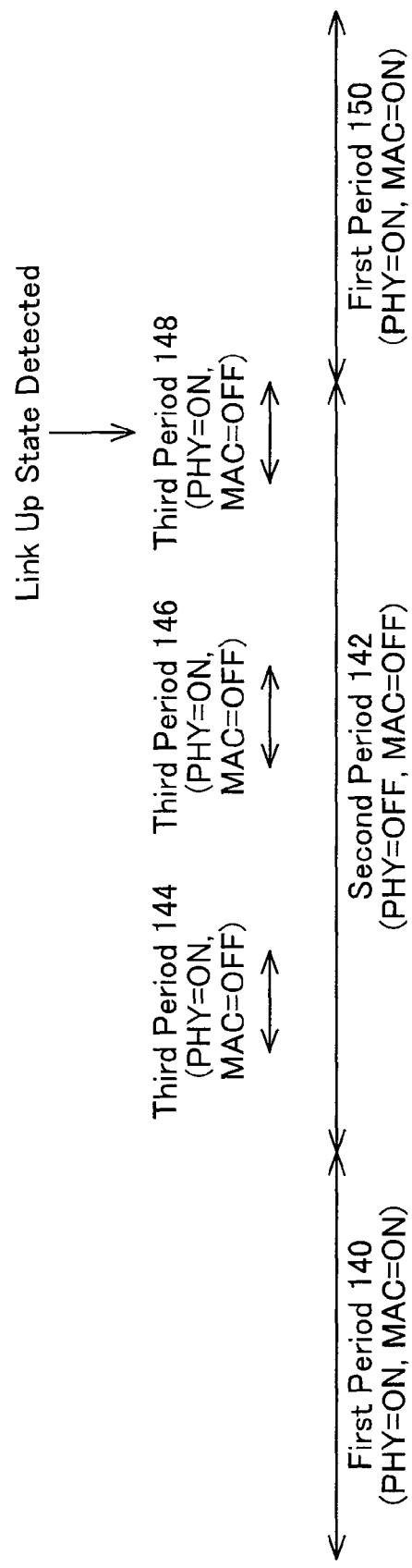
FIG. 10 shows an example of a state of the PHY chip and the MAC chip changing.

FIG. 10 shows an example of the state of the PHY chip 40 and the MAC chip 42 changing. In the example of FIG. 10 also, as with the case of FIG. 7 of the first embodiment, the first period 140 shifts to the second period 142. The second period 142 includes three third periods 144, 146, 148. During the respective third periods 144, 146, 148, power supply to the PHY chip 40 is performed, and power supply to the MAC chip 42 is not performed. If the link up state is detected in the third period 148, the ON state of the PHY chip 40 is maintained during the third period 148 (S48 is not executed if the determination at S46 of FIG. 9 is NO), and power supply to the MAC chip 42 is commenced (refer to S50 of FIG. 9). The continuous electrical power supply for the PHY chip 40 and the MAC chip 42 is thereby commenced, and the period shifts once again to the first period 150.

In this embodiment, since the power supply to the MAC chip 42 is not performed during the third periods 144, 146, 148, further power saving of the multi-function device 10 can be realized.

Third Embodiment

The points that are different from the first embodiment are explained. In the first embodiment, as shown in FIG. 7 and FIG. 8, power supply to the both the PHY chip 40 and the MAC chip 42 is stopped during the second periods 102, 122. In this embodiment, while the power source of the multi-function device 10 is turned ON, the power supply to the PHY chip 40 is not stopped. Specifically, in this embodiment, power saving of the second period is realized by stopping the power supply only to the MAC chip 42.

The sub CPU 38 of this embodiment sends the stop command to the power source unit 20 for stopping the power supply to the MAC chip 42 in the processing of S16 of FIG. 4. Consequently, the power source unit 20 stops the power supply only to the MAC chip 42. The ON state of the PHY chip 40 is maintained. Moreover, the main CPU 36 of this embodiment sends the supply command to the power source unit 20 for performing the power supply to the MAC chip 42 in the processing at S30 of FIG. 6. Consequently, the power source unit 20 resumes the power supply to the MAC chip 42.

Figure 11:
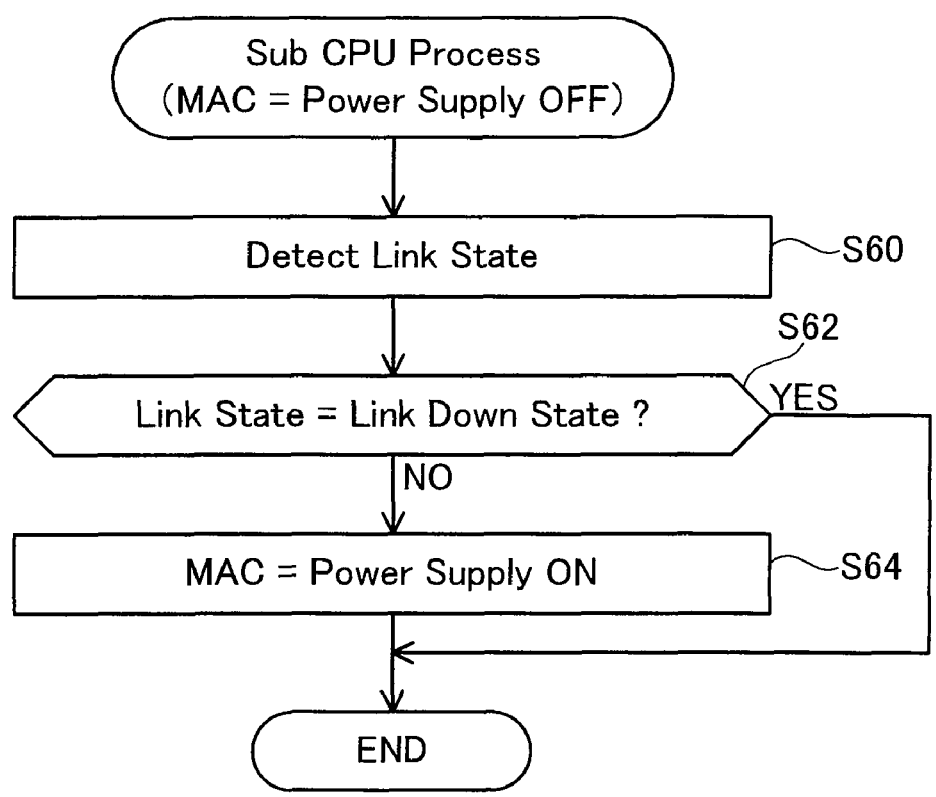
FIG. 11 shows a flowchart of processing to be executed by the sub CPU (third embodiment).

Moreover, the sub CPU 38 of this embodiment periodically executes the processing shown in FIG. 11 while the MAC chip 42 is in the OFF state. The sub CPU 38 detects the link state based on the foregoing specific information obtained from the PHY chip 40 (S60). The sub CPU 38 determines whether the link state is the link down state (S62). If the determination is YES at S62, the sub CPU 38 skips S64 and ends the processing. Meanwhile, if the determination is NO at S62, the sub CPU 38 sends the supply command to the power source unit 20 for performing the power supply to the MAC chip 42 (S64). Consequently, the MAC chip 42 shifts once again from the OFF state to the ON state.

Figure 12:
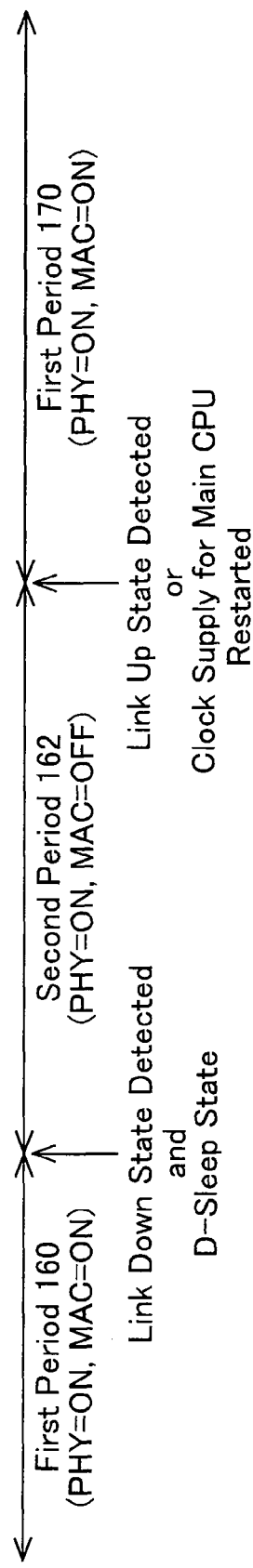
FIG. 12 shows an example of a state of the PHY chip and the MAC chip changing.

FIG. 12 shows an example of the state of the PHY chip 40 and the MAC chip 42 changing. During the link up state, a first period 160 in which the continuous electrical power supply is performed to the PHY chip 40 and the MAC chip 42 is realized. During the first period 160, if the link state becomes the link down state and the multi-function device 10 becomes the D-sleep state, the continuous electrical power supply for the MAC chip 42 is stopped, and the period shifts to the second period 162. However, the PHY chip 40 is maintained in the ON state. If the link up state is detected in the second period 162, or if the clock supply to the main CPU 36 is resumed, the continuous electrical power supply for the MAC chip 42 is commenced (refer to S64 of FIG. 11), and the period shifts once again to the first period 170.

With the multi-function device 10 of this embodiment, during the first period 160, if it becomes the link down state and the multi-function device 10 becomes the D-sleep state 76, power saving of the second period 162 is realized by stopping the continuous electrical power supply for the MAC chip 42. In this embodiment, since the PHY chip 40 is maintained in a state of being able to send the foregoing specific information to the sub CPU 38 even during the second period 162, the MAC chip 42 can be returned to the ON state (that is, the multi-function device 10 can be shifted to a communicable state) immediately after the user performs the processing for shifting from the link down state to the link up state.

As evident from the foregoing explanation, the multi-function device 10 of this embodiment is an example of a "network device." The PHY chip 40 and the MAC chip 42 are respectively examples of a "PHY layer process unit" and a "MAC layer process unit." The main CPU 36 and the sub CPU 38 are both examples of a "determination unit," a "first control unit," and a "control unit," and the main CPU 36 is an example of a "second control unit."

Modified examples of the foregoing embodiment are listed below.

(1) In each of the foregoing embodiments, the power supply to the PHY chip 40 and the MAC chip 42 (only to the MAC chip 42 in the third embodiment) is stopped if the link state is the link down state and the multi-function device 10 is in the D-sleep state 76. Nevertheless, the power supply to the PHY chip 40 and the MAC chip 42 (only to the MAC chip 42 in the third embodiment) may be stopped in the link down state regardless of whether the multi-function device 10 is in the D-sleep state 76 (that is, regardless of whether or not the clock supply to the main CPU 36 is being executed).

(2) In each of the foregoing embodiments, the user may be allowed to switch the mode between the first mode and the second mode. In the first mode, the main CPU 36 and the sub CPU 38 may execute the processing (FIGS. 4 to 6, 9, and 11) of each of the foregoing embodiments. Meanwhile, in the second mode, the main CPU 36 and the sub CPU 38 do not have to execute the processing (FIGS. 4 to 6, 9, and 11) of each of the foregoing embodiments. Specifically, in the second mode, the PHY chip 40 and the MAC chip 42 may be maintained in the ON state while the power source of the multi-function device 10 is ON.

(3) In the foregoing embodiment, the L-sleep state 74 may be omitted. Specifically, if a state where a command for executing the foregoing specific processing is not input in the stand-by state 72 continues for a predetermined time, the clock supply to the main CPU 36 may be suspended, and the light source of the LCD 18 may become the unlit state.

(4) In the foregoing embodiment, the main CPU 36 is changed to the sleeping state by suspending the clock supply to the main CPU 36. Nevertheless, the main CPU 36 can also be changed to the sleeping state by reducing the clock frequency without suspending the clock supply to the main CPU 36.

(5) The technology of the foregoing embodiment can also be applied to other network devices of PC, server, printer, scanner, telephone device, facsimile device and the like.

(6) The term of "sleeping state" may also be rephrased, but not limited to, as "state with lower power consumption than the non-sleeping state."

What is claimed is:

1. A network device configured to be connected with a network, the network device comprising:
    a PHY layer process unit configured to execute a process of a PHY layer;
    a determination unit configured to determine that a link state is a link up state or a link down state by utilizing information provided by the PHY layer process unit, wherein the link up state is a state in which the network device is being connected with the network in a communicable manner, and the link down state is a state in which the network device is not being connected with the network in a communicable manner;
    a first control unit configured to control an electrical power supply for the PHY layer process unit; and
    a second control unit configured to shift between a sleeping state and a non-sleeping state,
    wherein the first control unit is configured to:
    stop a continuous electrical power supply for the PHY layer process unit, if the determination unit determines that the link state is the link down state during a first period and the second control unit is in the sleeping state during the first period, wherein the first period is a period in which the continuous electrical power supply for the PHY layer process unit is being performed;
    perform a temporary electrical power supply for the PHY layer process unit during a second period, wherein the second period is a period after the continuous electrical power supply for the PHY layer process unit is stopped; and
    commence the continuous electrical power supply for the PHY layer process unit, if the temporary electrical power supply for the PHY layer process unit is performed during the second period and the determination unit determines that the link state is the link up state.

2. The network device as in claim 1, wherein the first control unit is configured to repeat performing the temporary electrical power supply for the PHY layer process unit during the second period.

3. The network device as in claim 1, wherein the first control unit is configured to further commence the continuous electrical power supply for the PHY layer process unit regardless of the link state, when the second control unit shifts from the sleeping state to the non-sleeping state during the second period.

4. The network device as in claim 1, further comprising:
    a MAC layer process unit configured to execute a process of a MAC layer,
    wherein the first control unit is configured to further control an electrical power supply for the MAC layer process unit, and
    the first control unit is configured to:
    further stop a continuous electrical power supply for the MAC layer process unit, if the determination unit determines that the link state is the link down state during the first period and the second control unit is in the sleeping state during the first period; and
    further commence the continuous electrical power supply for the MAC layer process unit, if the temporary electrical power supply for the PHY layer process unit is performed during the second period and the determination unit determines that the link state is the link up state.

5. The network device as in claim 4, wherein the first control unit is configured not to perform a temporary electrical power supply for the MAC layer process unit during the second period, when performing the temporary electrical power supply for the PHY layer process unit during the second period.

6. A network device configured to be connected with a network, the network device comprising:
    a PHY layer process unit configured to execute a process of a PHY layer;
    a MAC layer process unit configured to execute a process of a MAC layer,
    a determination unit configured to determine that a link state is a link up state or a link down state by utilizing information provided by the PHY layer process unit, wherein the link up state is a state in which the network device is being connected with the network in a communicable manner, and the link down state is a state in which the network device is not being connected with the network in a communicable manner; and
    a first control unit configured to control an electrical power supply for the PHY layer process unit and control an electrical power supply for the MAC layer process unit,
    wherein the first control unit is configured to:
    stop a continuous electrical power supply for the PHY layer process unit and stop a continuous electrical power supply for the MAC layer process unit, if the determination unit determines that the link state is the link down state during the first period, wherein the first period is a period in which the continuous electrical power supply for the PHY layer process unit is being performed;
    perform a temporary electrical power supply for the PHY layer process unit during a second period, wherein the second period is a period after the continuous electrical power supply for the PHY layer process unit is stopped; and commence the continuous electrical power supply for the PHY layer process unit and commence the continuous electrical power supply for the MAC layer process unit, if the temporary electrical power supply for the PHY layer process unit is performed during the second period and the determination unit determines that the link state is the link up state, wherein the first control unit is configured not to perform a temporary electrical power supply for the MAC layer process unit during the second period, when performing the temporary electrical power supply for the PHY layer process unit during the second period.

7. The network device as in claim 6, wherein the first control unit is configured to repeat performing the temporary electrical power supply for the PHY layer process unit during the second period.

8. The network device as in claim 6, further comprising:
a second control unit configured to shift between a sleeping state and a non-sleeping state, wherein the first control unit is configured to stop the continuous electrical power supply for the PHY layer process unit, if the determination unit determines that the link state is the link down state during the first period and the second control unit is in the sleeping state during the first period.

9. The network device as in claim 6, wherein the first control unit is configured to further commence the continuous electrical power supply for the PHY layer process unit regardless of the link state, when the second control unit shifts from the sleeping state to the non-sleeping state during the second period.

* * * * *